(12) United States Patent
Tsai et al.

(10) Patent No.: US 10,802,193 B2
(45) Date of Patent: Oct. 13, 2020

(54) LIGHT SOURCE MODULE AND DUAL-SCREEN DISPLAY DEVICE

(71) Applicant: Coretronic Corporation, Hsin-Chu (TW)

(72) Inventors: Wen-Chin Tsai, Hsin-Chu (TW); Hui-Chuan Chen, Hsin-Chu (TW); Yin-Jen Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/199,125

(22) Filed: Nov. 23, 2018

(65) Prior Publication Data

US 2019/0271805 A1 Sep. 5, 2019

(30) Foreign Application Priority Data

Mar. 2, 2018 (CN) ...................... 2018 2 0293288 U

(51) Int. Cl.
*G02B 6/00* (2006.01)
*F21V 8/00* (2006.01)

(52) U.S. Cl.
CPC .......... *G02B 6/0025* (2013.01); *G02B 6/0056* (2013.01)

(58) Field of Classification Search
CPC ................. G02B 6/0056; G02B 6/0025–0063
See application file for complete search history.

(56) References Cited

U.S. PATENT DOCUMENTS

| 8,049,840 B2* | 11/2011 | Akiyama | G02B 6/0038 349/114 |
| 9,436,037 B2* | 9/2016 | Ning | G02F 1/133608 |
| 9,791,613 B2* | 10/2017 | Shei | G02B 6/005 |
| 9,857,525 B2* | 1/2018 | Huang | G02B 6/0053 |
| 10,048,538 B1* | 8/2018 | Fukuoka | G09G 3/36 |
| 10,056,048 B2* | 8/2018 | Kim | G02B 6/0016 |
| 10,088,700 B2* | 10/2018 | Zhang | G02B 6/0088 |
| 10,409,109 B2* | 9/2019 | Fan | G02B 6/0063 |
| 2003/0231483 A1* | 12/2003 | Higashiyama | G02B 6/0038 362/610 |
| 2005/0046321 A1* | 3/2005 | Suga | G02B 6/0041 313/112 |

(Continued)

FOREIGN PATENT DOCUMENTS

| CN | 104848052 A | 8/2015 |
| TW | 200627024 A | 8/2006 |
| TW | 201643516 A | 12/2016 |

*Primary Examiner* — Anabel Ton

(57) ABSTRACT

A light source module includes a light guide plate, a first inverse prism sheet, a second inverse prism sheet, and a light source. The light guide plate has a light incident surface, a first light emitting surface and an opposing second light emitting surface. The second light emitting surface has a plurality of microstructures. Each microstructure is a recessed structure. The first inverse prism sheet is disposed beside the first light emitting surface of the light guide plate. The first inverse prism sheet includes a plurality of first prism columns. The first prism columns face the first light emitting surface. The second inverse prism sheet is disposed beside the second light emitting surface of the light guide plate. The second inverse prism sheet includes a plurality of second prism columns. The second prism columns face the second light emitting surface. The light source is disposed beside the light incident surface.

18 Claims, 4 Drawing Sheets

(56) References Cited

U.S. PATENT DOCUMENTS

| | | | | |
|---|---|---|---|---|
| 2007/0086210 A1* | 4/2007 | Miyashita | ............ | G02B 6/0031 362/627 |
| 2008/0106915 A1* | 5/2008 | Okuda | ................ | G02B 6/0028 362/628 |
| 2008/0112189 A1* | 5/2008 | Okuda | ................ | G02B 6/0083 362/617 |
| 2008/0239200 A1* | 10/2008 | Hirai | .................... | G02B 6/0053 349/62 |
| 2008/0252823 A1* | 10/2008 | Hwang | ................ | G02B 6/0038 349/96 |
| 2015/0070903 A1* | 3/2015 | Min | .................... | G02B 5/0268 362/311.06 |

\* cited by examiner

LIGHT SOURCE MODULE AND DUAL-SCREEN DISPLAY DEVICE

CROSS-REFERENCE TO RELATED APPLICATION

This application claims the priority benefit of China application No. 201820293288.X, filed on Mar. 2, 2018. The entirety of the above-mentioned patent application is hereby incorporated by reference herein and made a part of this specification.

FIELD OF THE INVENTION

The invention relates to a light source module, and more particularly to a light source module capable of double-sided light emission, and a dual-screen display device using the same light source module.

BACKGROUND OF THE INVENTION

The liquid crystal displaying panel of the liquid crystal display device does not emit light, so a surface light source needs to be provided by a backlight module. The backlight module includes a direct type backlight module and an edge type backlight module. At present, a commonly used direct type backlight module is configured by arranging a plurality of light emitting diodes arranged in a two dimensional array below a diffusion sheet. However, although the direct type backlight module has better brightness uniformity, there is a problem that the thickness is relatively thick.

In the current edge type backlight module, since the light emitting diode strip is disposed on the edge of the light guide plate, it has a thinner thickness than the direct type backlight module. However, in the known technology, the edge type backlight module is paired with a light guide plate and a light source. Therefore, in the dual-screen liquid crystal display device, two sets of backlight modules are required, which will increase the volume and weight of the dual-screen liquid crystal display device.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a light source module suitable for a dual-screen display device.

The invention provides a dual-screen display device, which has the advantages of thinner thickness and lighter weight.

Other advantages and objects of the invention may be further illustrated by the technical features broadly embodied and described as follows.

In order to achieve one or a portion of or all of the objects or other objects, the light source module provided by an embodiment of the invention includes a light guide plate, a first inverse prism sheet, a second inverse prism sheet, and a light source. The light guide plate has a first light emitting surface and a second light emitting surface opposite to the first light emitting surface, and a light incident surface connected between the first light emitting surface and the second light emitting surface. The second light emitting surface has a plurality of microstructures. Each microstructure is a recessed structure. The recessed structure has a first surface that is inclined relative to the second light emitting surface. The first surface faces toward the light incident surface. The first inverse prism sheet is disposed beside the first light emitting surface of the light guide plate. The first inverse prism sheet includes a plurality of first prism columns. The first prism columns are arranged along a predetermined direction which is from the light incident surface and away from the light incident surface. The first prism columns face the first light emitting surface. The second inverse prism sheet is disposed beside the second light emitting surface of the light guide plate. The second inverse prism sheet includes a plurality of second prism columns. The second prism columns are arranged along the predetermined direction, and the second prism columns face the second light emitting surface. The light source is disposed beside the light incident surface. The light source is for emitting light into the light guide plate through the light incident surface.

In order to achieve one or a portion of or all of the above purposes or other purposes, an embodiment of the invention provides a dual-screen display device including a first displaying panel, a second displaying panel, and the light source module. The first displaying panel is disposed on a side of the first inverse prism sheet away from the light guide plate. The second displaying panel is disposed on a side of the second inverse prism sheet away from the light guide plate.

In the light source module of the invention, the light guide plate has a plurality of recessed microstructures. When the light hits the microstructure, part of the light can be reflected and emitted from the first light emitting surface, and part of the light can be refracted and emitted from the second light emitting surface, such that the effect of double-sided light emission can be achieved. In addition, the first inverse prism sheet and the second inverse prism sheet can converge the light to increase the brightness of the light emitted from the light source module. The dual-screen display device of the invention can provide the use requirements of double-sided display due to the use of the light source module, and thus has the advantages of thinner thickness and lighter weight.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
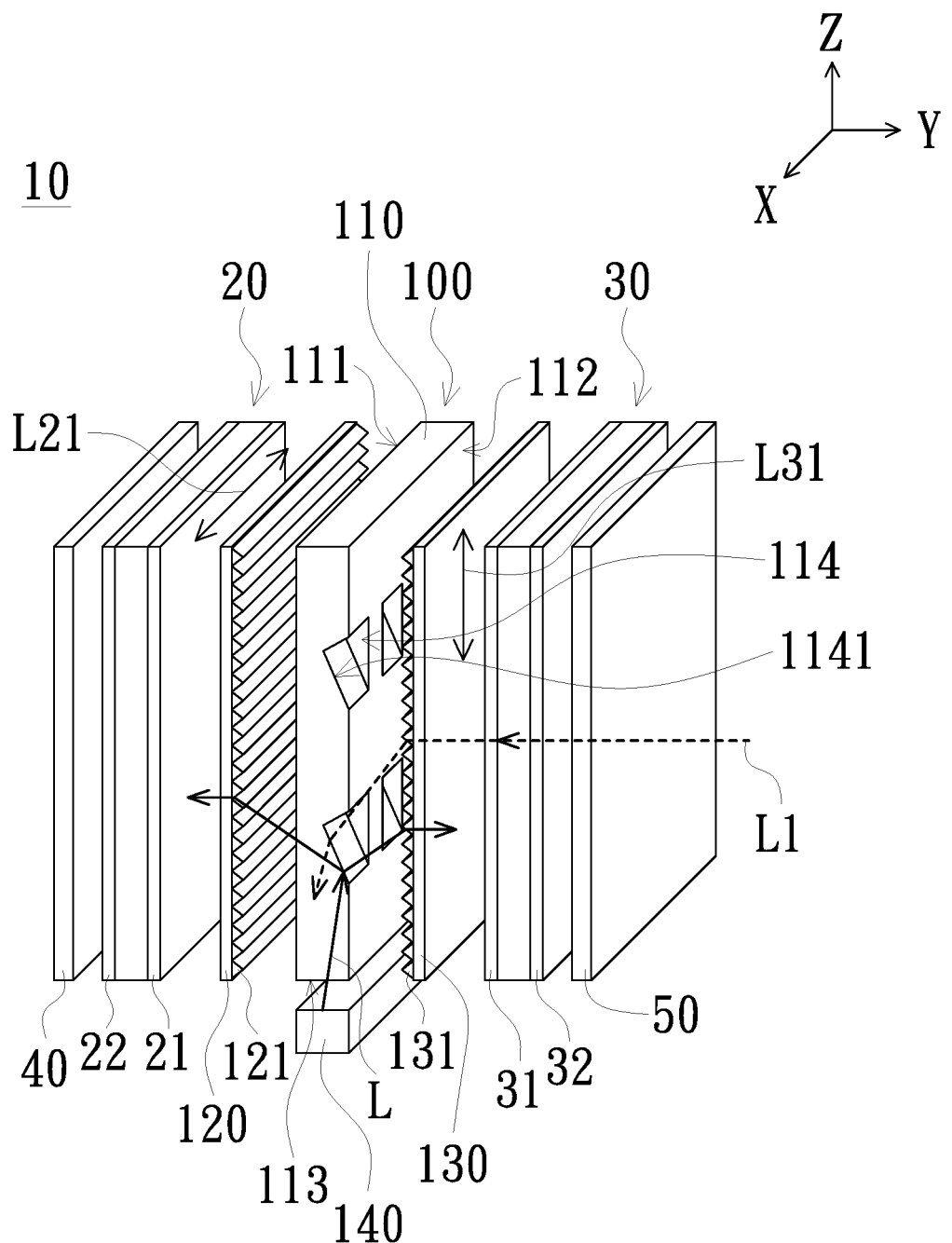
FIG. 1 is a schematic cross-sectional view of a dual-screen display device according to an embodiment of the invention.

FIG. 1 is a schematic cross-sectional view of a dual-screen display device according to an embodiment of the invention. Referring to FIG. 1, the dual-screen display device 10 of the embodiment includes a light source module 100, a first displaying panel 20, and a second displaying panel 30. The first displaying panel 20 and the second displaying panel 30 are located at two sides of the light source module 100.

The light source module 100 includes a light guide plate 110, a first inverse prism sheet 120, a second inverse prism sheet 130, and a light source 140. The light guide plate 110 has a first light emitting surface 111 and a second light emitting surface 112 opposite to the first light emitting surface 111, and a light incident surface 113 connected between the first light emitting surface 111 and the second light emitting surface 112. The second light emitting surface 112 has a plurality of microstructures 114 (only four are schematically shown in FIG. 1). Each of the microstructures 114 is a recessed structure. The recessed structure has a first surface 1141 inclined relative to the second light emitting surface 112. The first surface 1141 faces toward the light incident surface 113. Each microstructure 114 is uniformly distributed on the second light emitting surface 112, for example. In another embodiment, each microstructure 114 may also be unevenly distributed on the second light emitting surface 112. The first inverse prism sheet 120 is disposed beside the first light emitting surface 111 of the light guide plate 110. The first inverse prism sheet 120 includes a plurality of first prism columns 121. The first prism columns 121 are arranged along a predetermined direction Z which is from the light incident surface 113 and away from the light incident surface 113. The first prism columns 121 face the first light emitting surface 111. The second inverse prism sheet 130 is disposed beside the second light emitting surface 112 of the light guide plate 110. The second inverse prism sheet 130 includes a plurality of second prism columns 131. The second prism columns 131 are arranged along the predetermined direction Z, and the second prism columns 131 face the second light emitting surface 112. The first prism column 121 and the second prism column 131 extend along a direction X, and the angle between the direction X and the predetermined direction Z is, for example, 90 degrees. The light source 140 is disposed beside the light incident surface 113. The light source 140 is used for emitting the light L to enter the light guide plate 110 through the light incident surface 113. The first displaying panel 20 is disposed on a side of the first inverse prism sheet 120 away from the light guide plate 110. The second displaying panel 30 is disposed on a side of the second inverse prism sheet 130 away from the light guide plate 110.

The light source 140 is, for example, a bar-shaped light source including a plurality of point light sources. The point light source is, for example, a light emitting diode (LED), but not limited thereto. The light source 140 may also be other kinds of strip-shaped light sources, such as a lamp tube, and the invention does not limit the type of the light source.

The first displaying panel 20 and the second displaying panel 30 are, for example, liquid crystal display panels. In the embodiment, the first displaying panel 20 is, for example, a transmissive displaying panel or a transflective displaying panel, and the second displaying panel 30 is, for example, a transmissive displaying panel or a transflective displaying panel.

The light guide plate 110 in the light source module 100 of the embodiment has a plurality of recessed microstructures 114. When the light L hits the microstructure 114, part of the light can be reflected and emitted from the first light emitting surface 111. Part of the light is refracted and emitted from the second light emitting surface 112. Therefore, the function of dual side light emitting is achieved. In addition, the first inverse prism sheet 120 and the second inverse prism sheet 130 can converge the light to increase the brightness of light emitted from the light source module 100. The dual-screen display device 10 can provide the use requirements of double-sided display due to the use of the light source module 100, and thus has the advantages of thinner thickness and lighter weight.

The first displaying panel 20 includes, for example, a first polarizer 21 located on a side of the first displaying panel 20 adjacent to the first inverse prism sheet 120. The second displaying panel 30 includes a second polarizer 31 located on a side of the second displaying panel 30 adjacent to the second inverse prism sheet 130. The first polarizer 21 has a first absorption axis L21, and the second polarizer 31 has a second absorption axis L31. The angle between an axial direction of the first absorption axis L21 and an axial direction of the second absorption axis L31 is, for example, 90 degrees. In the embodiment, the axial direction of the first absorption axis L21 is, for example, parallel to the direction X, and the axial direction of the second absorption axis L31 is, for example, parallel to the predetermined direction Z.

When external light L1 enters the light source module 100, for example, through the second displaying panel 30, the second inverse prism sheet 130 and the microstructures 114 of the light guide plate 110 direct the external light L1 to deviate from the original direction of entry, so that the external light L1 is less easily incident to the first displaying panel 20 and to cause imaging interference. In addition, when the external light L1 passes through the second polarizer 31, the external light L1 is converted into polarized light perpendicular to the axial direction of the second absorption axis L31. Since the axial direction of the first absorption axis L21 and the axial direction of the second absorption axis L31 have an included angle in a range of 0 degree to 90 degrees (90 degrees in the embodiment), the external light L1, which is converted into the polarized light perpendicular to the axial direction of the second absorption axis L31, is parallel to the first absorption axis L21 and is absorbed by the first polarizer 21, so that this polarized light cannot pass through the first polarizer 21. Thereby, the interference on the imaging of the first displaying panel 20 at another side of the dual-screen display device 10, caused by the external light L1 incident on the second displaying panel 30 from one side of the dual-screen display device 10, can be reduced. Similarly, the interference in the imaging of the second displaying panel 30 at another side of the dual-screen display device 10, caused by external light (not shown) incident on the first displaying panel 20 from one side of the dual-screen display device 10, can also be reduced.

In the foregoing embodiment, although the axial direction of the first absorption axis L21 and the axial direction of the second absorption axis L31 have an included angle of 90 degrees as an example, the invention is not limited thereto. In another embodiment, the angle between the axial direction of the first absorption axis L21 and the axial direction of the second absorption axis L31 is, for example, 0 degree, that is, the first absorption axis L21 and the second absorption axis L31 are in parallel. In this case, a similar effect can be achieved by selecting the first displaying panel 20 and the second displaying panel 30 with lower transmittance. For example, when the external light L1 is incident on the first displaying panel 20 with lower transmittance from one side of the dual-screen display device 10, the brightness of the polarized light passing through the first displaying panel 20 is less than 10% of the brightness of the external light L1. As such, the interference in the imaging of the first displaying panel 20 at another side of the dual-screen display device 10, caused by the external light L1 incident on the second displaying panel 30 from one side of the dual-screen display device 10, can also be reduced.

When the first displaying panel 20 and the second displaying panel 30 are liquid crystal display panels, the first displaying panel 20 may further include a third polarizer 22 located on a side of the first displaying panel 20 away from the first inverse prism sheet 120. The second displaying panel 30 may further include a fourth polarizer 32 located on a side of the second displaying panel 30 away from the second inverse prism sheet 130. Axial directions of absorption axes of the third polarizer 22 and the fourth polarizer 32 may be determined according to the types and properties of liquid crystals used in the first displaying panel 20 and the second displaying panel 30, and are not limited herein.

The dual-screen display device 10 of the embodiment may further include a first cover sheet 40 and a second cover sheet 50. The first cover sheet 40 is located on a side of the first displaying panel 20 away from the first inverse prism sheet 120, and faces the third polarizer 22. The second cover sheet 50 is located on a side of the second displaying panel 30 away from the second inverse prism sheet 130, and faces the fourth polarizer 32. The first cover sheet 40 and the second cover sheet 50 are, for example, cover glass for providing functions of dust prevention and protection. In another embodiment, the first cover sheet 40 and the second cover sheet 50 further include a touch sensible layer so that the dual-screen display device 10 can be provided with a touch function. It is also allowed to select and use just one of the first cover sheet 40 and the second cover sheet 50 in the above embodiments.

Figure 2:
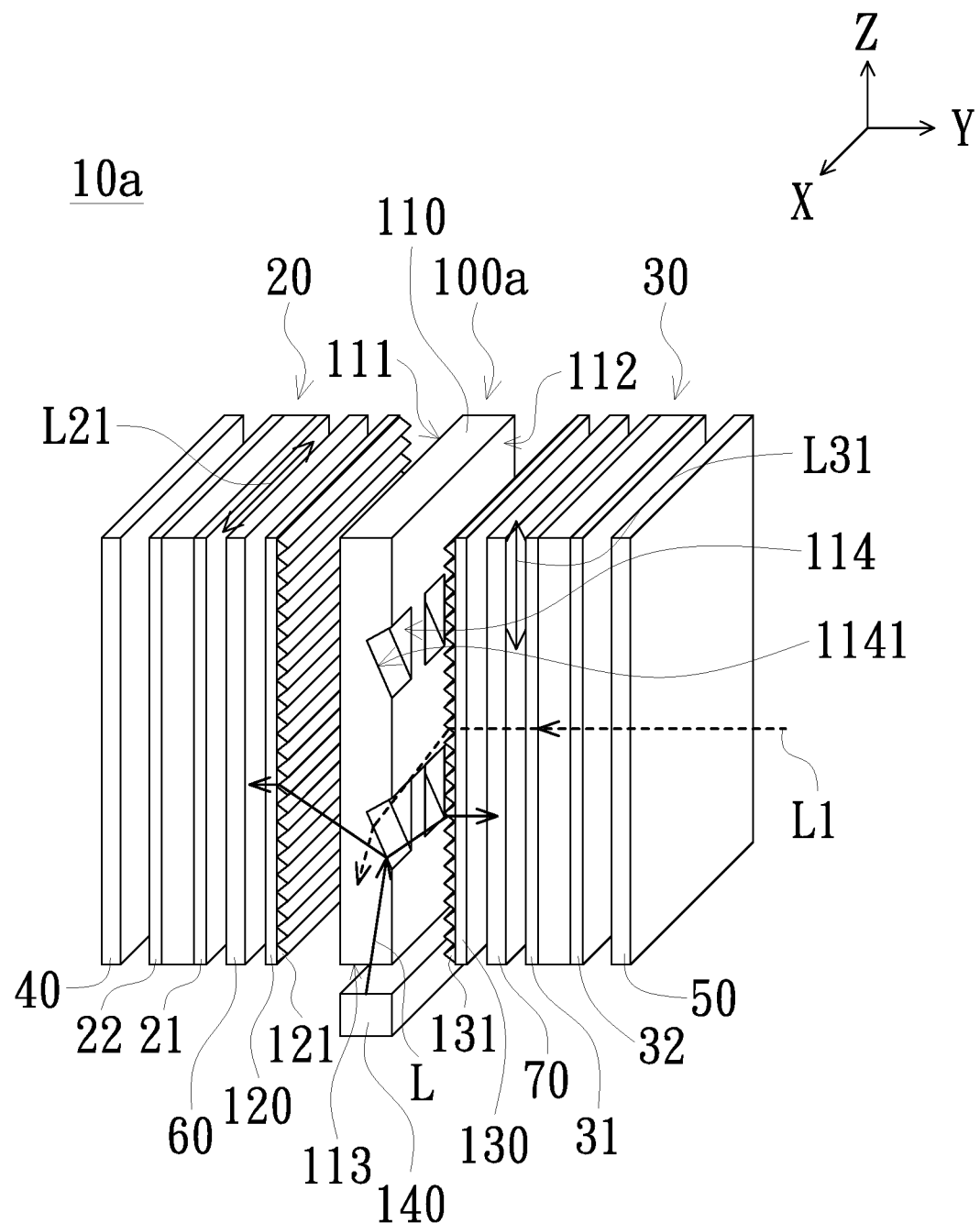
FIG. 2 is a schematic cross-sectional view of a dual-screen display device according to another embodiment of the invention.

FIG. 2 is a schematic cross-sectional view of a dual-screen display device according to another embodiment of the invention. Referring to FIG. 2, the dual-screen display device 10a of the embodiment is similar in structure to the dual-screen display device 10. The only difference is that the light source module 100a of the embodiment may further include a first polarized brightness enhancement film 60 and a second polarized brightness enhancement film 70. The first polarized brightness enhancement film 60 is disposed on a side of the first inverse prism sheet 120 away from the first light emitting surface 111, and is located between the first inverse prism sheet 120 and the first displaying panel 20. The first polarized brightness enhancement film 60 has a first transmission axis (not shown) for passing the light of the polarization direction in parallel with the first transmission axis and reflecting the light of the polarization direction not in parallel with the first transmission axis. The second polarized brightness enhancement film 70 is disposed on a side of the second inverse prism sheet 130 away from the second light emitting surface 112, and is located between the second inverse prism sheet 130 and the second displaying panel 30. The second polarized brightness enhancement film 70 has a second transmission axis (not shown) for passing the light of the polarization direction in parallel with the second transmission axis and reflecting the light of the polarization direction not in parallel with the second transmission axis. The first polarized brightness enhancement film 60 and the second polarized brightness enhancement film 70 are, for example, an advanced polarization conversion film (APCF) or a dual brightness enhancement film (DBEF), but not limited thereto. When the first polarized brightness enhancement film 60 and the second polarized brightness enhancement film 70 are advanced polarization conversion films, the first polarized brightness enhancement film 60 is attached to the first polarizer 21, for example, and the second polarized brightness enhancement film 70 is attached to the second polarizer 31, for example. In the embodiment, the first polarized brightness enhancement film 60 and the second polarized brightness enhancement film 70 can allow part of the light L, whose polarization directions are parallel to the first transmission axis and the second transmission axis, to pass therethrough, and reflect part of the light L of other polarization directions back to the light guide plate 110 for reuse, so that the light emitting efficiency can be improved. It is also allowed to select and use just one of the first polarized brightness enhancement film 60 and the second polarized brightness enhancement film 70 included in the light source module 100a of the above embodiments.

Figure 3:
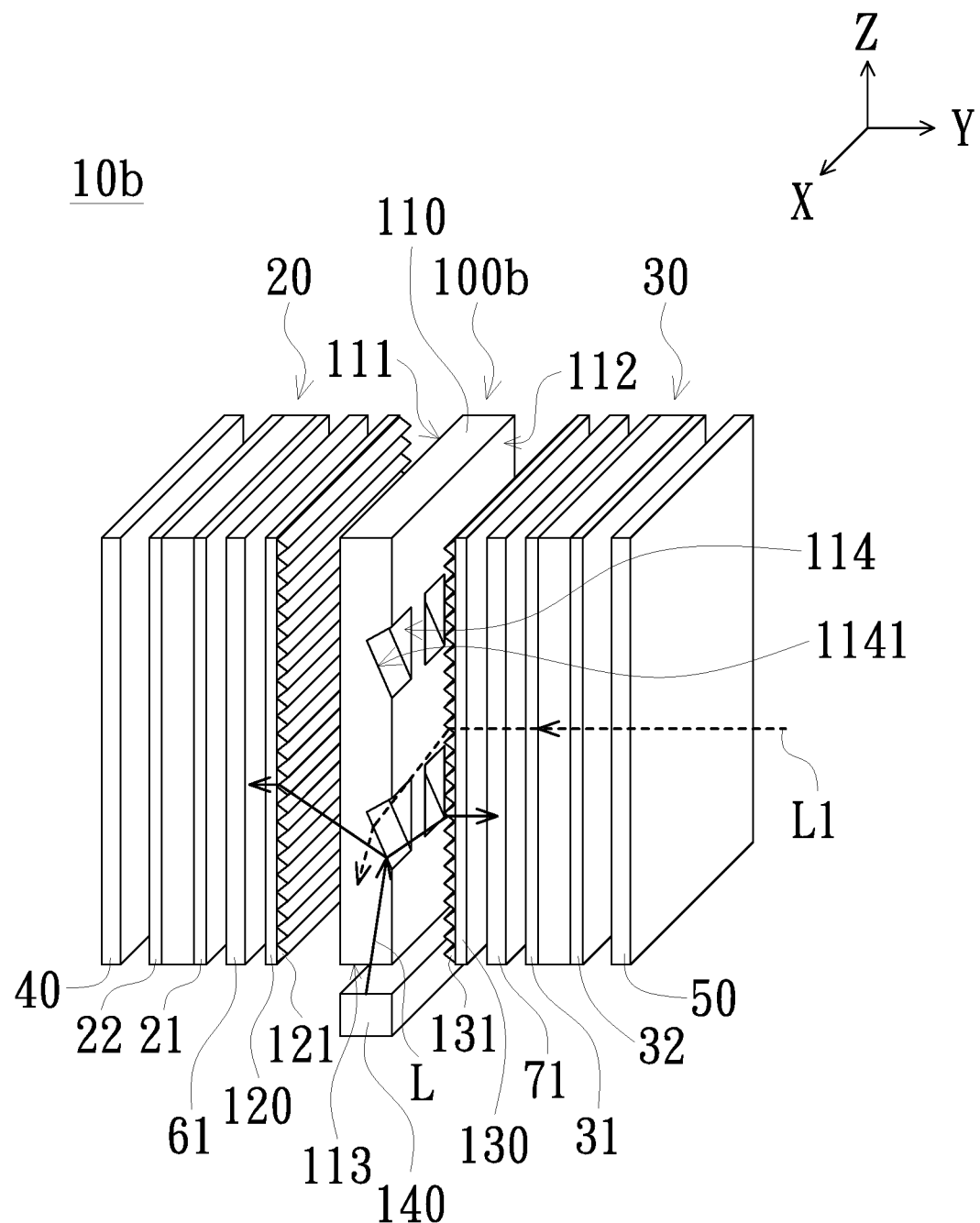
FIG. 3 is a schematic cross-sectional view of a dual-screen display device according to another embodiment of the invention.

FIG. 3 is a schematic cross-sectional view of a dual-screen display device according to another embodiment of the invention. Referring to FIG. 3, the dual-screen display device 10b of the embodiment is similar in structure to the dual-screen display device 10. The only difference is that the light source module 100b of the embodiment may further include a first diffusion sheet 61 and a second diffusion sheet 71. The first diffusion sheet 61 is disposed on a side of the first inverse prism sheet 120 away from the first light emitting surface 111, and is located between the first inverse prism sheet 120 and the first displaying panel 20. The second diffusion sheet 71 is disposed on a side of the second inverse prism sheet 130 away from the second light emitting surface 112, and is located between the second inverse prism sheet 130 and the second displaying panel 30. In the embodiment, the first diffusion sheet 61 and the second diffusion sheet 71 allow the light L to diffuse. It is also allowed to select and use just one of the first diffusion sheet 61 and the second diffusion sheet 71 included in the light source module 100b of the above embodiment.

Figure 4:
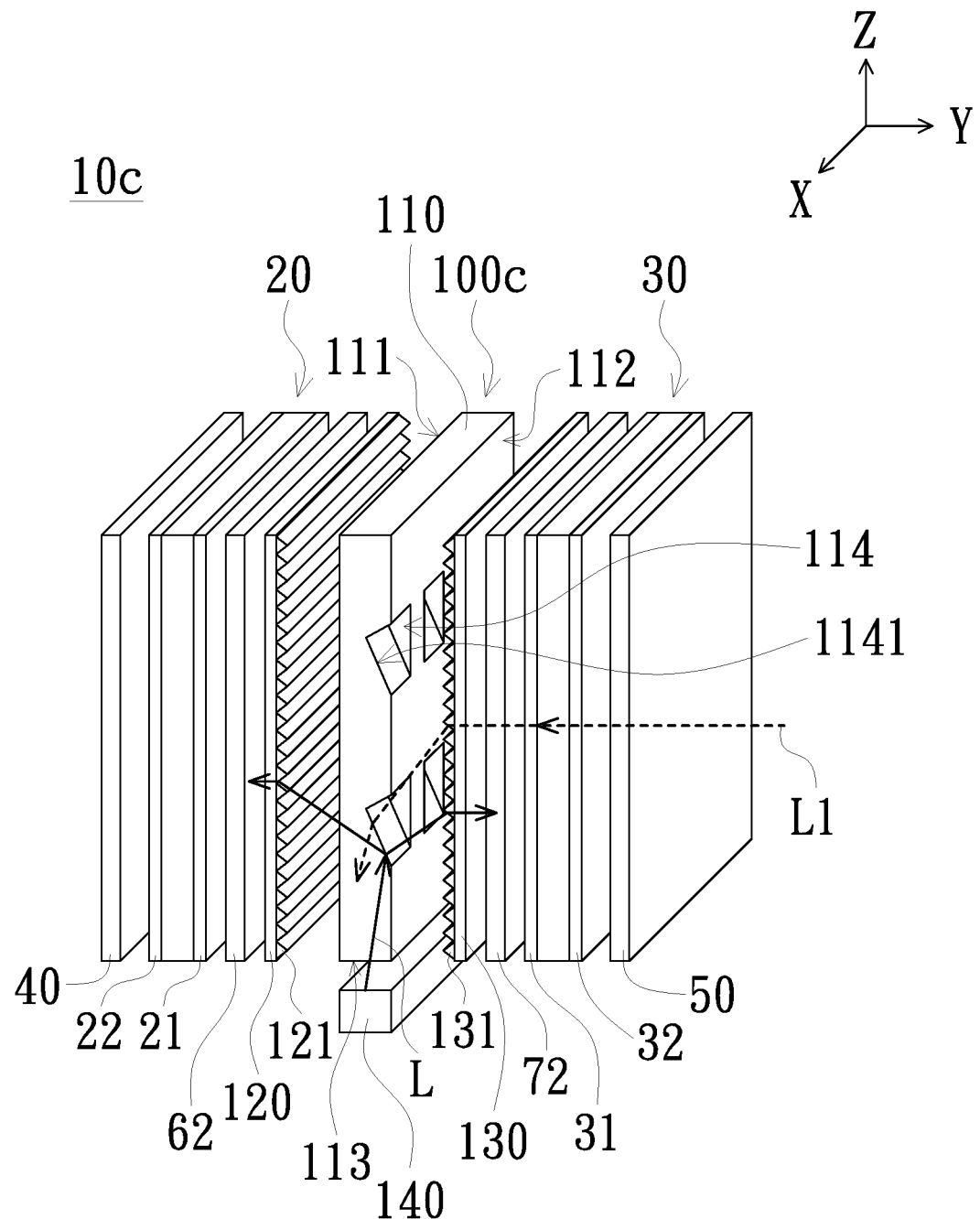
FIG. 4 is a schematic cross-sectional view of a dual-screen display device according to another embodiment of the invention.

FIG. 4 is a schematic cross-sectional view of a dual-screen display device according to another embodiment of the invention. Referring to FIG. 4, the dual-screen display device 10c of the embodiment is similar in structure to the dual-screen display device 10. The only difference is that the light source module 100c of the embodiment may further include a first transflective sheet 62 and a second transflective sheet 72. The first transflective sheet 62 is disposed on a side of the first inverse prism sheet 120 away from the first light emitting surface 111 and is located between the first inverse prism sheet 120 and the first displaying panel 20. The second transflective sheet 72 is disposed on a side of the second inverse prism sheet 130 away from the second light emitting surface 112, and is located between the second inverse prism sheet 130 and the second displaying panel 30. The first transflective sheet and the second transflective sheet are, for example, reflective sheets having a plurality of openings, but not limited thereto. When the first displaying panel 20 and the second displaying panel 30 are, for example, transmissive displaying panels, the light L is transmitted and the external light L1 is reflected through the first transflective sheet 62 and the second transflective sheet 72. Therefore, the first displaying panel 20 and the second displaying panel 30 can achieve the function of the transflective displaying panel, but not limited thereto. It is also allowed to select and use just one of the first transflective sheet 62 and the second transflective sheet 72 included in the light source module 100c of the aforementioned embodiment.

It is also allowed to select and use just one of the first polarized brightness enhancement film 60 and the second polarized brightness enhancement film 70 included in the light source module 100a of the aforementioned embodiment. For example, only the first polarized brightness enhancement film 60 is configured. The above example is also applicable to the light source modules 100b and 100c. In addition, two opposite sides of the light guide plate 110 may be matched with films of different functions for use according to design requirements, for example, the first polarized brightness enhancement film 60 and the second transflective sheet 72 are configured, but not limited thereto.

In summary, the light guide plate in the light source module of the embodiment of the invention has a plurality of recessed microstructures. When the light hits the microstructure, part of the light can be reflected and emitted from the first light emitting surface, and part of the light is refracted and emitted from the second light emitting surface. Therefore, the effect of double-sided light emission can be achieved. In addition, the first inverse prism sheet and the second inverse prism sheet can converge the light to increase the brightness of the light emitted from the light source module. The dual-screen display device of the invention can provide the use requirements of double-sided display due to the use of the light source module, and thus has the advantages of thinner thickness and lighter weight.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first inverse prism sheet, the second inverse prism sheet, the first light emitting surface and the second light emitting surface, etc. are only used for distinguishing various elements and do not limit the number of the elements.

What is claimed is:

1. A light source module, comprising:
  a light guide plate, having a first light emitting surface, a second light emitting surface opposite to the first light emitting surface, and a light incident surface connected between the first light emitting surface and the second light emitting surface;
  a first inverse prism sheet, disposed beside the first light emitting surface of the light guide plate, wherein the first inverse prism sheet comprises a plurality of first prism columns, the first prism columns are arranged along a predetermined direction which is from the light incident surface and away from the light incident surface, and the first prism columns face the first light emitting surface;

a second inverse prism sheet, disposed beside the second light emitting surface of the light guide plate, wherein the second inverse prism sheet comprises a plurality of second prism columns, the second prism columns are arranged along the predetermined direction, and the second prism columns face the second light emitting surface; and a light source, disposed beside the light incident surface, wherein the light source is for emitting light into the light guide plate through the light incident surface;

wherein the second light emitting surface has a plurality of microstructures, each of the microstructures is a recessed structure, the recessed structure has a first surface inclined relative to the second light emitting surface, and the first surface faces toward the light incident surface.

2. The light source module according to claim 1, further comprising a polarized brightness enhancement film disposed on a side of the first inverse prism sheet facing away the first light emitting surface, wherein the polarized brightness enhancement film has a transmission axis for passing light of a polarization direction in parallel with the transmission axis and reflecting light of polarization directions not in parallel with the transmission axis.

3. The light source module according to claim 1, further comprising a polarized brightness enhancement film disposed on a side of the second inverse prism sheet facing away the second light emitting surface, wherein the polarized brightness enhancement film has a transmission axis for passing light of a polarization direction in parallel with the transmission axis and reflecting light of polarization directions not in parallel with the transmission axis.

4. The light source module according to claim 2, wherein the polarized brightness enhancement film is an advanced polarization conversion film or a dual brightness enhancement film.

5. The light source module according to claim 3, wherein the polarized brightness enhancement film is an advanced polarization conversion film or a dual brightness enhancement film.

6. The light source module according to claim 1, further comprising a diffusion sheet disposed on a side of the first inverse prism sheet facing away the first light emitting surface.

7. The light source module according to claim 1, further comprising a diffusion sheet disposed on a side of the second inverse prism sheet facing away the second light emitting surface.

8. The light source module according to claim 1, further comprising a transflective sheet disposed on a side of the first inverse prism sheet facing away the first light emitting surface.

9. The light source module according to claim 1, further comprising a transflective sheet disposed on a side of the second inverse prism sheet facing away the second light emitting surface.

10. The light source module according to claim 8, wherein the transflective sheet is a reflective sheet having a plurality of openings.

11. The light source module according to claim 9, wherein the transflective sheet is a reflective sheet having a plurality of openings.

12. A dual-screen display device, comprising:
a light source module, comprising:
a light guide plate, having a first light emitting surface, a second light emitting surface opposite to the first light emitting surface, and a light incident surface connected between the first light emitting surface and the second light emitting surface;

a first inverse prism sheet, disposed beside the first light emitting surface of the light guide plate, wherein the first inverse prism sheet comprises a plurality of first prism columns, the first prism columns are arranged along a predetermined direction which is from the light incident surface and away from the light incident surface, and the first prism columns face the first light emitting surface;

a second inverse prism sheet, disposed beside the second light emitting surface of the light guide plate, wherein the second inverse prism sheet comprises a plurality of second prism columns, the second prism columns are arranged along the predetermined direction, and the second prism columns face the second light emitting surface; and a light source, disposed beside the light incident surface, wherein the light source is for emitting light into the light guide plate through the light incident surface;

a first displaying panel, disposed on a side of the first inverse prism sheet facing away the light guide plate; and a second displaying panel, disposed on a side of the second inverse prism sheet facing away the light guide plate;

wherein the second light emitting surface has a plurality of microstructures, each of the microstructures is a recessed structure, the recessed structure has a first surface inclined relative to the second light emitting surface, and the first surface faces toward the light incident surface.

13. The dual-screen display device according to claim 12, wherein the first displaying panel is a transmissive displaying panel or a transflective displaying panel, and the second displaying panel is a transmissive displaying panel or a transflective displaying panel.

14. The dual-screen display device according to claim 12, wherein the first displaying panel comprises a first polarizer located on a side of the first displaying panel adjacent to the first inverse prism sheet, the second displaying panel comprises a second polarizer located on a side of the second displaying panel adjacent to the second inverse prism sheet, the first polarizer has a first absorption axis, the second polarizer has a second absorption axis, and an included angle between an axial direction of the first absorption axis and an axial direction of the second absorption axis is in a range of 0 degree to 90 degrees.

15. The dual-screen display device according to claim 14, wherein an included angle between the axial direction of the first absorption axis and the axial direction of the second absorption axis is 90 degrees.

16. The dual-screen display device according to claim 14, wherein an included angle between the axial direction of the first absorption axis and the axial direction of the second absorption axis is 0 degree.

17. The dual-screen display device according to claim 12, further comprising a cover sheet located on a side of the first displaying panel facing away the first inverse prism sheet.

18. The dual-screen display device according to claim 12, further comprising a cover sheet located on a side of the second displaying panel facing away the second inverse prism sheet.

* * * * *